(12) United States Patent
Kobayashi et al.

(10) Patent No.: US 12,184,959 B2
(45) Date of Patent: Dec. 31, 2024

(54) IMAGING DEVICE

(71) Applicant: Panasonic Intellectual Property Management Co., Ltd., Osaka (JP)

(72) Inventors: Kenichi Kobayashi, Kanagawa Ken (JP); Tomio Shimizu, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 144 days.

(21) Appl. No.: 17/968,519

(22) Filed: Oct. 18, 2022

(65) Prior Publication Data

US 2023/0039292 A1    Feb. 9, 2023

Related U.S. Application Data

(63) Continuation of application No. PCT/JP2020/044354, filed on Nov. 27, 2020.

(30) Foreign Application Priority Data

Apr. 27, 2020    (JP) .................. 2020-078688

(51) Int. Cl.
*H04N 23/52* (2023.01)
*B60S 1/02* (2006.01)
(Continued)

(52) U.S. Cl.
CPC .............. *H04N 23/52* (2023.01); *B60S 1/026* (2013.01); *B60S 1/56* (2013.01); *G01K 3/005* (2013.01); *H04N 23/51* (2023.01)

(58) Field of Classification Search
CPC ...... G03B 17/55; G02B 27/006; G02B 7/008; G02B 27/0006; B60R 11/04
See application file for complete search history.

(56) References Cited

U.S. PATENT DOCUMENTS 10,609,262 B2 * 3/2020 Kim ..................... G02B 7/028
2004/0223074 A1   11/2004 Takada
(Continued)

FOREIGN PATENT DOCUMENTS

CN    209881894 U   * 12/2019
JP        3462812       11/2003
(Continued)

OTHER PUBLICATIONS

International Search Report (ISR) from International Searching Authority (Japan Patent Office) in International Pat. Appl. No. PCT/JP2020/044354, dated Feb. 16, 2021, together with an English language translation.

*Primary Examiner* — Leon W Rhodes, Jr.
(74) *Attorney, Agent, or Firm* — Greenblum & Bernstein, P.L.C

(57) ABSTRACT

An imaging device according to the present disclosure includes a housing, a lens unit, a heater, an imaging unit, a temperature sensor, and a heater control unit. The lens unit is attached to the housing. The heater is provided in the lens unit. The imaging unit, the temperature sensor, and the heater control unit are housed in the housing. The imaging unit outputs an optical image formed by a light flux transmitted through the lens unit as an image signal. The heater control unit controls the heater in accordance with a temperature detection value by the temperature sensor.

11 Claims, 11 Drawing Sheets

(51) Int. Cl.
    *B60S 1/56*     (2006.01)
    *G01K 3/00*     (2006.01)
    *H04N 23/51*     (2023.01)

(56) References Cited

U.S. PATENT DOCUMENTS

| | | |
|---|---|---|
| 2011/0240701 A1 | 10/2011 | Totani et al. |
| 2016/0311375 A1* | 10/2016 | Biemer .................. B60R 11/04 |
| 2017/0079088 A1* | 3/2017 | Dahlqvist ............ H04N 23/695 |
| 2019/0337466 A1 | 11/2019 | Oba |
| 2021/0294066 A1 | 9/2021 | Hirata et al. |

FOREIGN PATENT DOCUMENTS

| | | |
|---|---|---|
| JP | 2004-325603 | 11/2004 |
| JP | 2008-160777 | 7/2008 |
| JP | 2011-207339 | 10/2011 |
| JP | 2019-219533 | 12/2019 |
| WO | 2018/105245 | 6/2018 |
| WO | 2019/225745 | 11/2019 |

\* cited by examiner

IMAGING DEVICE

CROSS-REFERENCE TO RELATED APPLICATIONS

This application is a continuation of International Application No. PCT/JP2020/044354, filed on Nov. 27, 2020 which claims the benefit of priority of the prior Japanese Patent Application No. 2020-078688, filed on Apr. 27, 2020, the entire contents of which are incorporated herein by reference.

FIELD

The present disclosure relates to an imaging device.

BACKGROUND

In recent years, an imaging device for capturing an image used for detecting an obstacle or the like may be mounted on a vehicle. The detection result is used for calling driver's attention, or used for control such as speed control, collision avoidance, parking assistance, or automated driving.

However, dew condensation or freezing on the surface of the lens of the imaging device blocks the field of view of the imaging device, and this may make it difficult to obtain an image showing the surrounding environment of the vehicle.

On the other hand, there is a technique of securing a field of view of an imaging device using a heater. For example, according to the technology described in JP 2008-160777 A, the imaging device is accommodated in a cover provided with a window, and can capture an image showing a surrounding environment through the window. Then, the dew condensation water or ice adhering to the window is removed by a heater provided on the window.

The present disclosure provides an imaging device capable of eliminating the need to provide a function for executing control of a heater outside an imaging device.

SUMMARY

An imaging device according to the present disclosure includes a housing, a lens unit, a heater, an imaging unit, a temperature sensor, and a heater control unit. The lens unit is attached to the housing. The heater is provided in the lens unit. The imaging unit, the temperature sensor, and the heater control unit are housed in the housing. The imaging unit outputs, as an image signal, an optical image formed by a light flux passing through the lens unit. The heater control unit controls the heater in accordance with a temperature detection value by the temperature sensor.

DETAILED DESCRIPTION

Hereinafter, embodiments of an imaging device according to the present disclosure will be described with reference to the drawings.

First Embodiment

Figure 1:
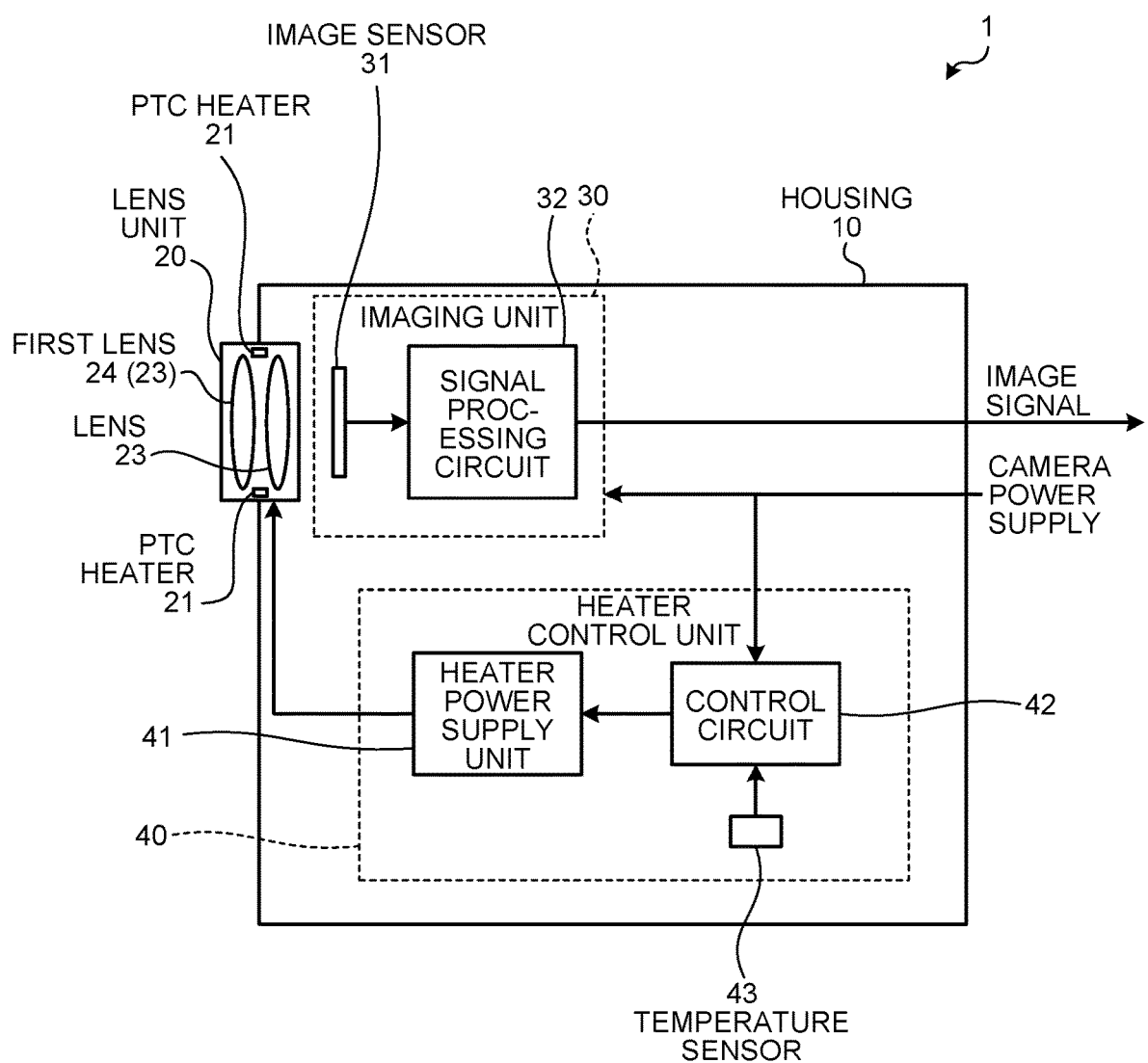
FIG. 1 is a schematic diagram illustrating an example of a configuration of an imaging device according to a first embodiment.

FIG. 1 is a schematic diagram illustrating an example of a configuration of an imaging device according to a first embodiment. An imaging device 1 is provided in a vehicle. The type of the vehicle in which the imaging device 1 is provided is not limited to a specific type. For example, the vehicle provided with the imaging device 1 may be an automobile, a railway vehicle, an agricultural vehicle, a construction vehicle, a military vehicle, or the like. The vehicle provided with the imaging device 1 may be a vehicle requiring a driver or a vehicle capable of unmanned driving.

The imaging device 1 can output an image showing a surrounding environment of the vehicle. A control device of the vehicle can detect an obstacle around the vehicle on the basis of the image obtained by the imaging device 1. The obstacle is a person, an object, another vehicle, or the like. The control device of the vehicle may detect a state of a road surface, a road sign, a lane marking set on the road surface, and the like. The control device of the vehicle can use the detection result to notify the driver of a detection result to call attention, and for control of the host vehicle such as speed control, collision avoidance, parking assistance, or automated driving. Note that the method of using the image obtained by the imaging device 1 is not limited thereto.

The imaging device 1 includes a housing 10, a lens unit 20, an imaging unit 30, and a heater control unit 40.

The lens unit 20 includes one or more lenses 23. The imaging device 1 is attached to the vehicle such that an optical axis or axes of one or more lenses 23 face a predetermined direction with respect to the vehicle.

For example, the imaging device 1 is attached to an emblem portion or the like of an automobile in a posture in which the optical axis faces a road surface in front of the automobile. Alternatively, the imaging device 1 is attached to a rear license garnish portion or the like of the automobile in a posture in which the optical axis faces a road surface behind the automobile. Note that the position where the imaging device 1 is provided and the direction of the imaging device 1 are not limited thereto.

The imaging device 1 can sequentially capture a region to which the optical axis or axes of one or more lenses 23 are directed at a predetermined frame rate, and output a plurality of captured images obtained temporally continuously as an image signal of a moving image.

The lens unit 20 is provided with a positive temperature coefficient (PTC) heater 21. The PTC heater 21 is a heater having a characteristic that electric resistance increases as the temperature rises. According to the PTC heater 21, it is possible to prevent an abnormal temperature rise due to such a characteristic.

Figure 2:
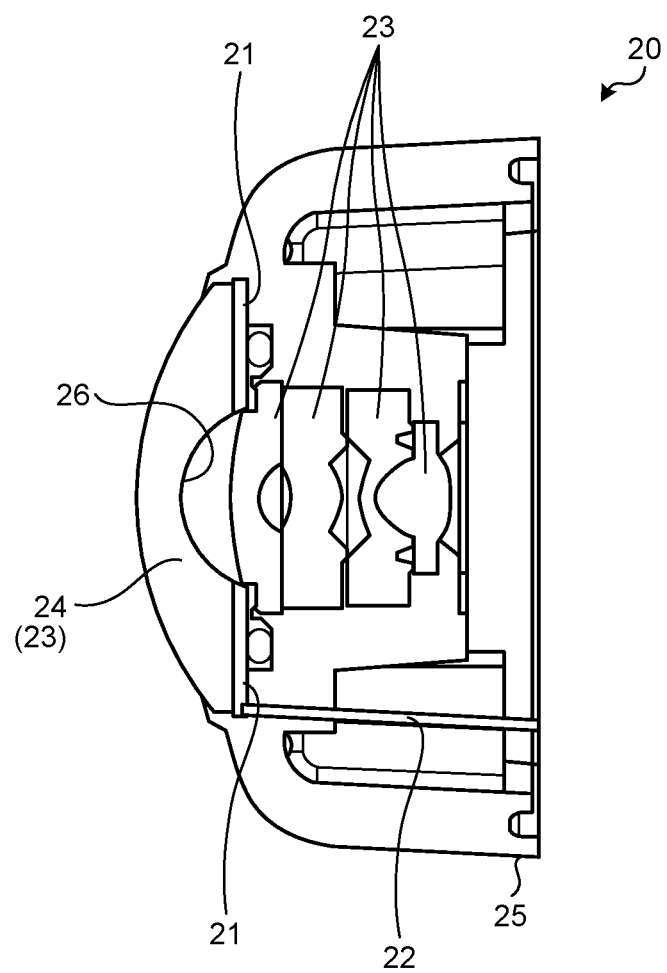
FIG. 2 is a schematic view illustrating an example of a specific configuration of a lens unit according to the first embodiment.
Figure 3:
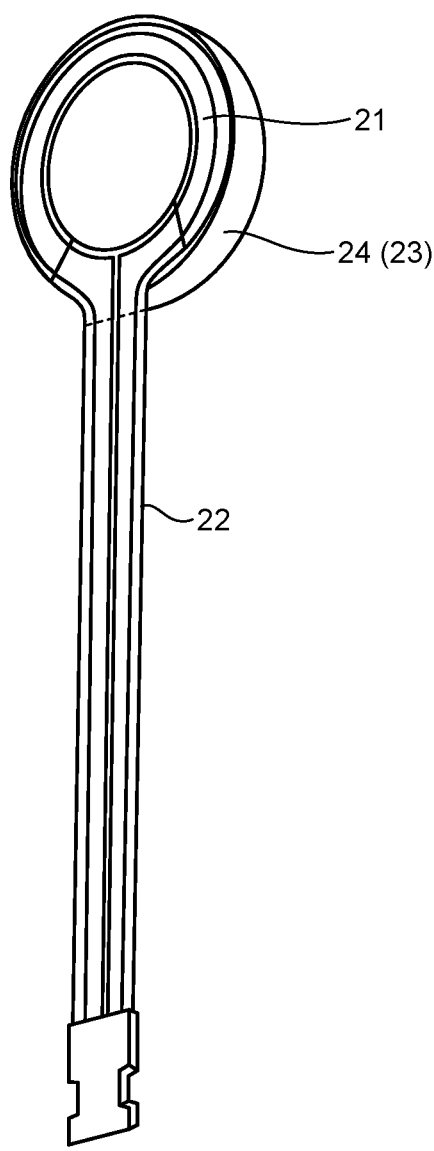
FIG. 3 is a schematic view illustrating a PTC heater provided in the lens unit according to the first embodiment.

FIG. 2 is a schematic view illustrating an example of a specific configuration of the lens unit 20 according to the first embodiment. FIG. 2 is a cross-sectional view of the lens unit 20 taken along the optical axis. FIG. 3 is a schematic view illustrating the PTC heater 21 provided in the lens unit 20 according to the first embodiment.

According to the example illustrated in FIG. 2, the lens unit 20 includes five lenses 23 arranged in the optical axis direction as one or more lenses 23. The five lenses 23 are supported by a lens barrel 25.

Then, as illustrated in FIGS. 2 and 3, the PTC heater 21 is provided at an edge portion of a first lens 24 which is the lens 23 located on the outermost side among the five lenses 23 and exposed to the surrounding environment. Power of a predetermined voltage is supplied from the heater control unit 40 to the PTC heater 21 via flexible printed circuits (FPCs) 22.

The surface of the first lens 24 is exposed to rain and wind, snow, and cool air from the surrounding environment, which causes dew condensation or freezing. The PTC heater 21 heats the first lens 24 to eliminate the dew condensation or freezing on the surface of the first lens 24, and thereby a field of view of the imaging device 1 can be secured.

Note that the PTC heater 21 is an example of the heater. The heater is not limited to the PTC heater 21.

For example, instead of a heater having similar characteristics to those of the PTC heater, a general metal heater can be employed in the shape of the PTC heater illustrated in FIG. 3. A normal metal heater can be provided at the same position as the PTC heater at the edge portion of the first lens 24.

Alternatively, a transparent and electrically conductive film such as an indium tin oxide (ITO) film can be employed as the heater. The ITO film can be provided on a back surface 26 (see FIG. 2) of the first lens 24 by vapor deposition or the like.

Alternatively, a metal film can be employed as the heater. The metal film can be provided on the edge portion of the first lens 24 by vapor deposition or the like.

Further, the position where the heater is provided is not limited to the first lens 24. For example, an arbitrary type of heater may be provided at an arbitrary position in the lens barrel 25. However, as illustrated in FIGS. 2 and 3, the heater is provided at the first lens 24, so that the surface of the first lens 24 exposed to the surrounding environment can be warmed with less power.

The description returns to FIG. 1.

The imaging unit 30 operates on the basis of power supplied from an external camera power supply. The imaging unit 30 outputs an optical image formed by a light flux transmitted through the lens unit 20 as an image signal. As a configuration for this purpose, the imaging unit 30 includes an image sensor 31 and a signal processing circuit 32.

The image sensor 31 is an imaging element that photoelectrically converts received light to generate a two-dimensional planar frame including a light intensity signal. The image sensor 31 is, for example, a CCD image sensor or a CMOS image sensor, or the like. Note that the type of the image sensor 31 is not limited thereto.

The lens unit 20 transmits a light flux from the surrounding environment and forms an optical image of the surrounding environment on the image sensor 31. Then, the image sensor 31 outputs a frame corresponding to the optical image. The image sensor 31 generates frames at a predetermined frame rate, and outputs the sequentially generated frames.

The signal processing circuit 32 is a circuit that performs various types of signal processing on frames sequentially output from the image sensor 31, and then outputs the frames after processing as the image signal. The processing executed by the signal processing circuit 32 is not limited to specific processing. For example, the signal processing circuit 32 can perform brightness adjustment, white balance adjustment, sharpness adjustment, contrast adjustment, denoising, compression, encoding, or the like.

The heater control unit 40 controls the PTC heater 21 according to the temperature in the housing 10. As a configuration for this purpose, the heater control unit 40 includes a heater power supply unit 41, a control circuit 42, and a temperature sensor 43.

The temperature sensor 43 is a sensor that detects the temperature in the housing 10. Any type of sensor can be employed as the temperature sensor 43. For example, a thermistor may be employed as the temperature sensor 43.

The heater power supply unit 41 is a regulator circuit that generates a voltage of a predetermined value. The heater power supply unit 41 applies a voltage of a predetermined value to the PTC heater 21 via the FPC 22.

The control circuit 42 operates on the basis of power supplied from the external camera power supply. The control circuit 42 causes the heater power supply unit 41 to execute or stop application of the voltage to the PTC heater 21 in accordance with a temperature detection value by the temperature sensor 43.

Figure 4:
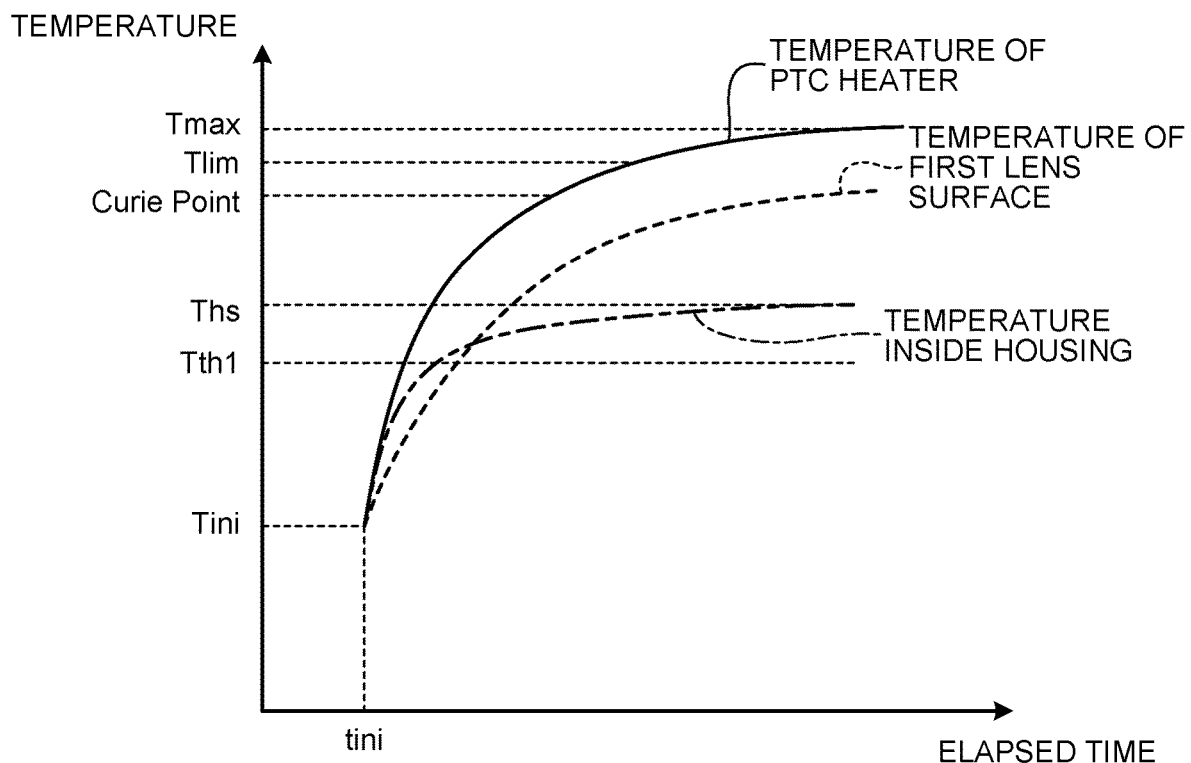
FIG. 4 is a diagram illustrating an example of transition of temperature of each part in a case where application of a voltage to the PTC heater is continued after activation in an imaging device having a same hardware configuration as the imaging device according to the first embodiment.

FIG. 4 is a diagram illustrating an example of transition of the temperature of each part in a case where the application of the voltage to the PTC heater is continued after the activation in the imaging device having the same hardware configuration as the imaging device 1 according to the first embodiment.

When the application of the voltage to the PTC heater is started at time tini when the imaging device is activated, the temperature of the PTC heater rises from a temperature Tini at the activation time tini as time passes. Note that the temperature Tini is the same as the outside air temperature, that is, the temperature of the surrounding environment. When the temperature of the PTC heater reaches the Curie point, the electrical resistance of the PTC heater rapidly increases, so that the current flowing through the PTC heater rapidly decreases and the heating value rapidly decreases. In this manner, the temperature of the PTC heater becomes constant at a temperature Tmax slightly higher than the Curie point.

The temperature of the surface of the first lens rises to follow the temperature of the PTC heater from the same temperature Tini as the outside air temperature. The temperature of the surface of the first lens changes at a temperature slightly lower than the temperature of the PTC heater.

The temperature inside the housing rises from the same temperature Tini as the outside air temperature according to self-heating of the imaging unit and the heater control unit and heat generation of the PTC heater. Since the temperature inside the housing is affected not only by the temperature of the PTC heater but also by self-heating of the imaging unit and the heater control unit, in the example illustrated in FIG. 4, the temperature rises faster than the temperature of the surface of the first lens. Then, the temperature inside the housing is constant at a temperature Ths lower than the temperature of the surface of the first lens.

Here, some components included in the imaging device have an allowable upper limit temperature. In a case where such components are used at high temperatures above allowable upper limit temperature, they may not operate normally, may fail, or may degrade faster. Thus, it is desirable to protect each component so that the temperature during operation does not exceed the allowable upper limit temperature.

In the first embodiment, as an example, the PTC heater 21 is a protection target. The PTC heater 21 has an allowable upper limit temperature Tlim, and in a case of being used at a temperature above the allowable upper limit temperature Tlim, the rate of degradation of the PTC heater 21 increases. Thus, the PTC heater 21 is on/off controlled so that the temperature of the PTC heater 21 does not exceed the allowable upper limit temperature Tlim.

Figure 5:
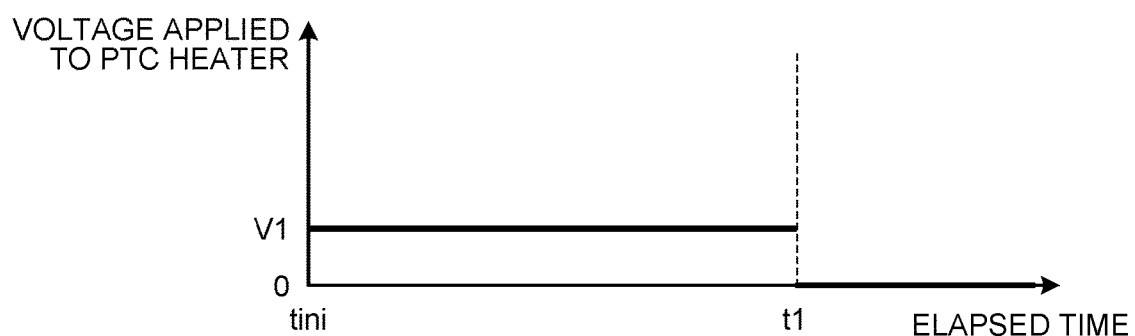
FIG. 5 is a diagram illustrating an example of transition of the voltage applied to the PTC heater according to the first embodiment.
Figure 6:
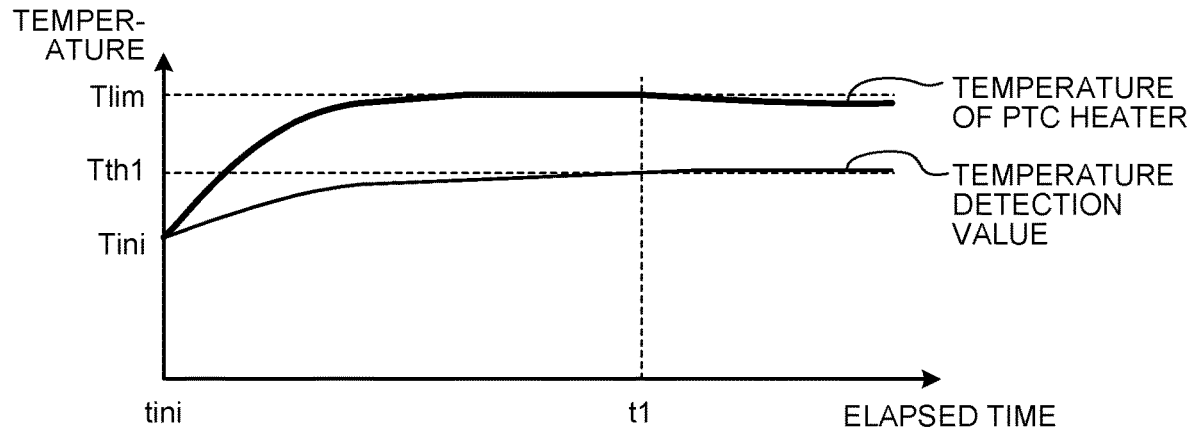
FIG. 6 is a diagram illustrating an example of transition of a temperature of each portion according to the first embodiment.

An example of on/off control of the PTC heater 21 will be described with reference to FIGS. 5 and 6. FIG. 5 is a diagram illustrating an example of transition of a voltage applied to the PTC heater 21 according to the first embodiment. FIG. 6 is a diagram illustrating an example of transition of the temperature of each portion according to the first embodiment. FIG. 6 illustrates the temperature of the PTC heater 21 and the temperature inside the housing 10 detected by the temperature sensor 43, that is, the temperature detection value by the temperature sensor 43.

According to the example illustrated in FIGS. 5 and 6, a threshold Tth1 regarding the temperature inside the housing 10 corresponding to the temperature Tlim of the PTC heater 21 is determined in advance. The threshold Tth1 is lower than the temperature Tlim, for example, as illustrated in FIG. 4. The control circuit 42 causes the heater power supply unit 41 to start applying the voltage V1 to the PTC heater 21 at the activation time tini. Then, at time t1 when the temperature detection value by the temperature sensor 43 exceeds the threshold Tth1, the control circuit 42 causes the heater power supply unit 41 to stop the application of the voltage to the PTC heater 21. In this manner, the heat generation of the PTC heater 21 can be stopped before the temperature of the PTC heater 21 exceeds Tlim.

Note that the threshold Tth1 corresponds to a first threshold. A method of obtaining the threshold Tth1 is arbitrary.

In one example, a designer can acquire the relationship between the temperature of the PTC heater 21 and the temperature inside the housing 10 as illustrated in FIG. 4 by experiment or calculation, and determine the threshold Tth1 on the basis of the relationship. The designer can obtain a difference Tdiff between the temperature of the PTC heater 21 and the temperature inside the housing 10 on the basis of the relationship, and set a value obtained by subtracting the Tdiff from the temperature Tlim as the threshold Tth1. A margin may be provided between the threshold Tth1 and a value obtained by subtracting the Tdiff from the temperature Tlim such that the threshold Tth1 is slightly lower than a value obtained by subtracting Tdiff from the temperature Tlim.

In another example, the designer can select a material to be used for the PTC heater so that the temperature of the PTC heater is in a steady state at Tlim, and set, as the threshold Tth1, a temperature Tc inside the housing when the temperature of the PTC heater is in a steady state at Tlim. A margin may be provided between Tc and the threshold Tth1 so that the threshold Tth1 is slightly lower than Tc.

Further, in a case where a heater other than the PTC heater is employed, there is no temperature restriction such as the Curie point. Thus, the designer can control the voltage applied to the heater so that the temperature of the heater becomes saturated at Tlim, and set, as the threshold Tth1, the temperature Tc inside the housing when the temperature of the heater is in a steady state at Tlim similarly to the PTC heater.

Note that the protection target is not limited to the PTC heater 21. For example, the temperature transition of the lens unit 20, the PTC heater 21, the image sensor 31, the signal processing circuit 32, the heater power supply unit 41, the control circuit 42, and the like is obtained, and among these components, if there is a component whose temperature reaches the allowable upper limit temperature earliest, the component can be set as a protection target. Note that the method of determining the protection target is not limited thereto.

The voltage V1 of the power supplied to the PTC heater 21 corresponds to a voltage of a first value.

Figure 7:
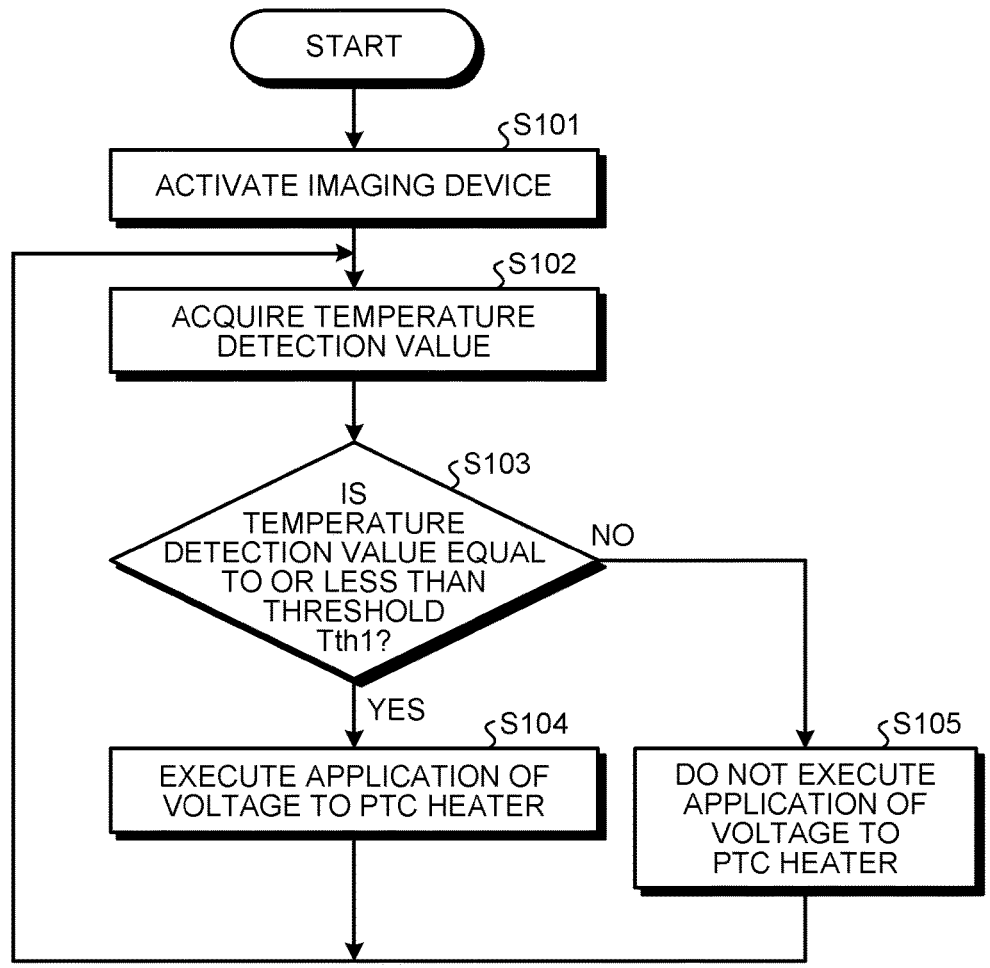
FIG. 7 is a flowchart illustrating an example of an operation of the imaging device according to the first embodiment.

FIG. 7 is a flowchart illustrating an example of the operation of the imaging device 1 according to the first embodiment.

When the imaging device 1 is activated (S101), the control circuit 42 acquires a temperature detection value from the temperature sensor 43 (S102). Then, the control circuit 42 determines whether or not the temperature detection value is equal to or less than the threshold Tth1 (S103). In a case where it is determined that the temperature detection value is equal to or less than the threshold Tth1 (S103: Yes), the control circuit 42 controls the heater power supply unit 41 to execute application of the voltage to the PTC heater 21 (S104). The voltage value at this time is V1.

In a case where it is determined that the temperature detection value exceeds the threshold Tth1 (S103: No), the control circuit 42 controls the heater power supply unit 41 so as not to apply the voltage to the PTC heater 21 (S105). After S104 or S105, the control proceeds to S102.

Loop processing from S102 to S104 or S105 is executed at a predetermined control cycle. The loop processing corresponds to a first control. The first control is ended by stopping the operation of the imaging device 1 or the like.

Note that, in the series of procedures illustrated in FIG. 7, in a case where the temperature detection value is equal to the threshold Tth1 in the determination processing of S103, the control proceeds to S104, and the voltage is applied to the PTC heater 21. The processing in the case where the temperature detection value is equal to the threshold Tth1 is not limited thereto. In the case where the temperature detection value is equal to the threshold Tth1, the control proceeds to S105, and the application of the voltage to the PTC heater 21 does not need to be executed.

As described above, according to the first embodiment, the heater control unit 40 controls the PTC heater 21, which is a heater provided in the lens unit 20, in accordance with the temperature detection value by the temperature sensor 43 accommodated in the housing 10.

Thus, it is not necessary to provide the function of executing the control of the PTC heater 21 outside the imaging device 1, such as the vehicle.

Further, since it is not necessary to input a signal related to control of the PTC heater 21, the same connector as the connector to which the conventional imaging device is connected can be used as the connector to which the imaging device 1 is connected. Thus, it is not necessary to provide a dedicated connector for connecting the imaging device 1 according to the first embodiment to the vehicle outside the imaging device 1, such as the vehicle. That is, it is possible to provide the imaging device 1 with less system dependency.

Further, since the temperature of the inside of the housing 10 is increased by the PTC heater 21, even if moisture enters the inside of the housing 10 and any lens 23 is fogged, the temperature of the inside of the housing 10 is increased, so that the fogging of the lens 23 can be eliminated.

Further, it is possible to eliminate dew condensation or freezing on the surface of the first lens 24 without providing a heater outside the imaging device 1.

Furthermore, it is possible to secure the field of view of the imaging device 1 without housing the imaging device 1 in the cover having the window.

By using the heater and the temperature sensor provided inside the imaging device 1, dew condensation or freezing on the surface of the lens of the imaging device 1 can be effectively eliminated, and the function of securing the field of view of the imaging device 1 can be achieved at low cost. Further, a function of securing a field of view of the imaging device 1 can be achieved by the imaging device 1 alone.

Further, according to the first embodiment, in a case where the temperature detection value by the temperature sensor 43 is lower than the threshold Tth1 which is the first threshold, the heater control unit 40 supplies power of the voltage V1 which is the voltage of the first value to the PTC heater 21. In a case where the temperature detection value by the temperature sensor 43 is higher than the threshold Tth1, the heater control unit 40 does not execute power supply to the PTC heater 21.

Thus, it is possible to protect each component constituting the imaging device 1 from overheating. Further, it is possible to make it unnecessary to provide a function for protecting each component constituting the imaging device 1 from overheating outside the imaging device 1, such as the vehicle.

Furthermore, the lens unit 20 includes one or more lenses 23. Then, the PTC heater 21 is provided on the first lens 24 that is the outermost lens among the one or more lenses 23.

Thus, the surface of first lens 24 exposed to the surrounding environment can be warmed with less power.

Second Embodiment

In a case where the outside air temperature is lower than 0° C., for example, at the time of activation of the imaging device, there is a possibility that the surface of the first lens is frozen. In a second embodiment, in order to secure the field of view of the imaging device as soon as possible even in such a situation, a voltage V2 higher than the voltage V1 is applied to the PTC heater until a predetermined time elapses after activation of the imaging device. In this manner, the PTC heater is rapidly heated, and freezing of the surface of the first lens is quickly eliminated. When a predetermined time elapses after the start of the imaging device, in order to protect the component as a protection target from overheating exceeding the allowable upper limit temperature, the on/off control based on the comparison between the temperature detection value and the threshold Tth1 described in the first embodiment, that is, the first control is executed.

Hereinafter, an imaging device 1a according to the second embodiment will be described. Note that components similar to those of the imaging device 1 according to the first embodiment are denoted by the same names and reference numerals as those of the imaging device 1, and description thereof will be omitted or simplified.

Figure 8:
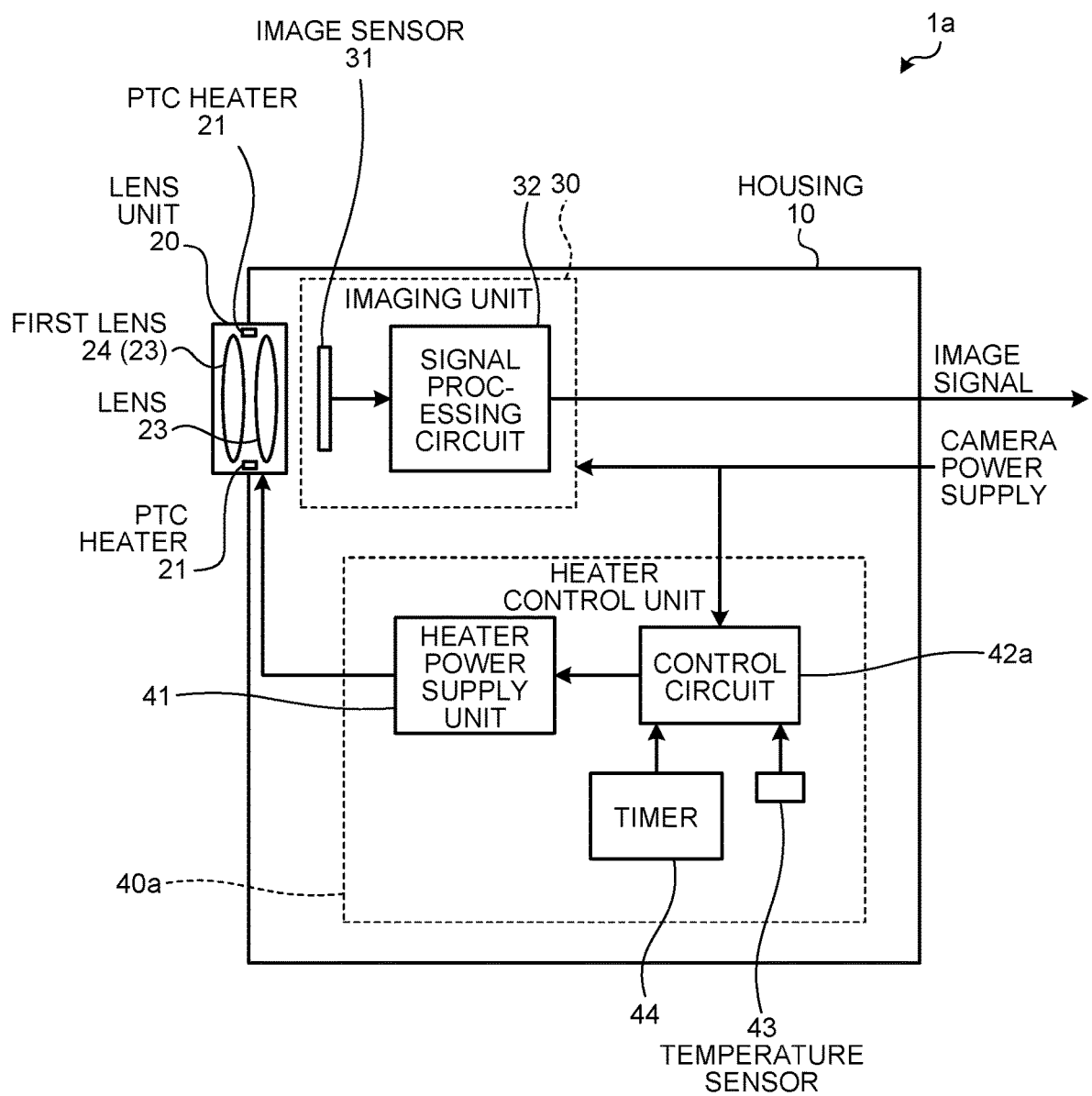
FIG. 8 is a schematic diagram illustrating an example of a configuration of an imaging device according to a second embodiment.

FIG. 8 is a schematic diagram illustrating an example of a configuration of an imaging device 1a according to the second embodiment. The imaging device 1a includes the housing 10, the lens unit 20, the imaging unit 30, and a heater control unit 40a. The imaging unit 30 includes the image sensor 31 and the signal processing circuit 32. The heater control unit 40a includes the heater power supply unit 41, a control circuit 42a, the temperature sensor 43, and a timer 44.

The control circuit 42a acquires the temperature detection value from the temperature sensor 43 at the time of activation of the imaging device 1a. The time at a time of activation of the imaging device 1a is defined as tini. In a case where the temperature detection value at the activation time tini is smaller than the threshold Tth2 corresponding to the outside air temperature at which the first lens 24 freezes, the control circuit 42a causes the heater power supply unit 41 to execute application of the voltage V2 to the PTC heater 21 for a predetermined period. Note that the voltage V2 corresponds to a voltage of a second value larger than the first value.

When the application of the voltage V2 is completed, the control circuit 42a starts the first control. That is, the control circuit 42a supplies power of the voltage V1 to the PTC heater 21 in a case where the temperature detection value is smaller than the threshold Tth1, and does not execute power supply to the PTC heater 21 in a case where the temperature detection value is larger than the threshold Tth1.

In a case where the temperature detection value at the activation time tini is larger than the threshold Tth2, the control circuit 42a starts the first control without applying the voltage V2 to the PTC heater 21.

The timer 44 is a hardware timer. The timer 44 counts an elapsed time from the start of application of the voltage V2. The control circuit 42a determines the end timing of application of the voltage V2 by using the timer 44. Note that the timer 44 may be configured by a software timer.

Figure 9:
FIG. 9 is a diagram illustrating an example of transition of a voltage applied to the PTC heater according to the second embodiment.
Figure 10:
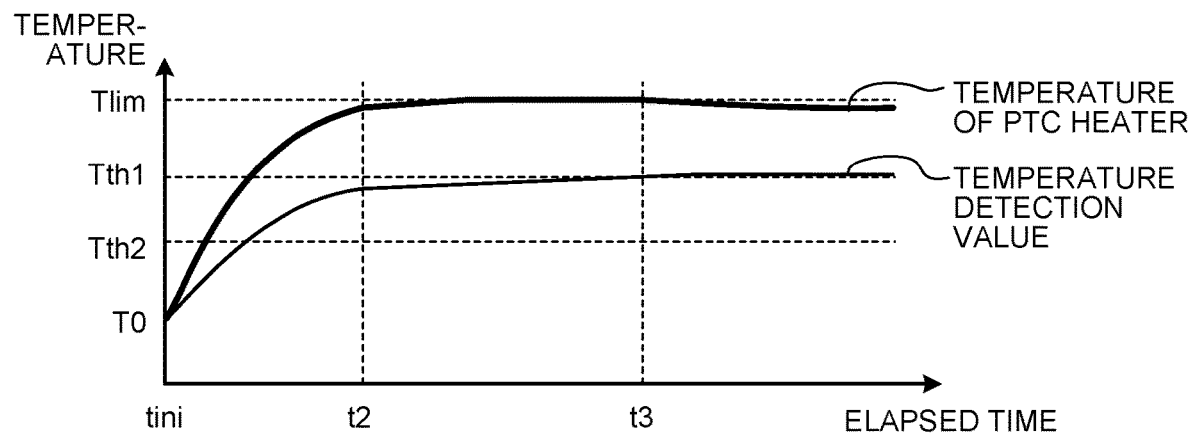
FIG. 10 is a diagram illustrating an example of transition of the temperature of each portion according to the second embodiment.

An example of control of the PTC heater 21 will be described with reference to FIGS. 9 and 10. FIG. 9 is a diagram illustrating an example of transition of the voltage applied to the PTC heater 21 according to the second embodiment. FIG. 10 is a diagram illustrating an example of transition of the temperature of each portion according to the second embodiment. FIG. 10 illustrates the temperature of the PTC heater 21 and the temperature inside the housing 10 detected by the temperature sensor 43, that is, the temperature detection value by the temperature sensor 43.

According to the examples illustrated in FIGS. 9 and 10, the temperature detection value T0 at the activation time tini is lower than the threshold Tth2. Thus, the control circuit 42a causes the heater power supply unit 41 to execute application of the voltage V2 to the PTC heater 21 during a period from the activation time tini until a predetermined time elapses. In this manner, the PTC heater 21 is warmed up earlier than in a case where the voltage V1 is applied to the PTC heater 21. Consequently, the freezing of the first lens 24 can be eliminated earlier as compared to a case where the voltage V1 is applied to the PTC heater 21.

At time t2 when the predetermined time has elapsed from the activation time tini, the control circuit 42a causes the heater power supply unit 41 to stop applying the voltage V2 to the PTC heater 21. At time t2, the temperature detection value is lower than the threshold Tth1. Thus, the control circuit 42a causes the heater power supply unit 41 to execute application of the voltage V1 to the PTC heater 21 from time t2. Then, at time t3 when the temperature detection value detected by the temperature sensor 43 exceeds the temperature Tth1, the control circuit 42a causes the heater power supply unit 41 to stop applying the voltage to the PTC heater 21. In this manner, the heat generation of the PTC heater 21 can be stopped before the temperature of the PTC heater 21 exceeds Tlim.

Note that the threshold Tth2 corresponds to a second threshold smaller than the first threshold. A method of obtaining the threshold Tth2 is arbitrary.

In one example, the designer measures a lower limit value Tm of the outside air temperature at which the freezing of the first lens 24 does not occur. Then, the designer activates the imaging device 1a when the outside air temperature is Tm, and measures the temperature T0' in the housing 10 at the time of activation by the temperature sensor 43. The designer can set the temperature T0' as the threshold Tth2. A margin may be provided between the temperature T0' and the threshold Tth2 so that the threshold Tth2 is slightly larger than the temperature T0'.

In another example, the designer starts applying a voltage to the PTC heater 21 in a state where the first lens 24 is frozen, and measures the transition of the temperature detection value by the temperature sensor 43 while observing the state of the first lens 24. Then, the designer can set the temperature detection value T0" by the temperature sensor 43 at the timing when the freezing of the first lens 24 is eliminated as the threshold Tth2. A margin may be provided between the temperature T0" and the threshold Tth2 so that the threshold Tth2 is slightly larger than the temperature T0".

Figure 11:
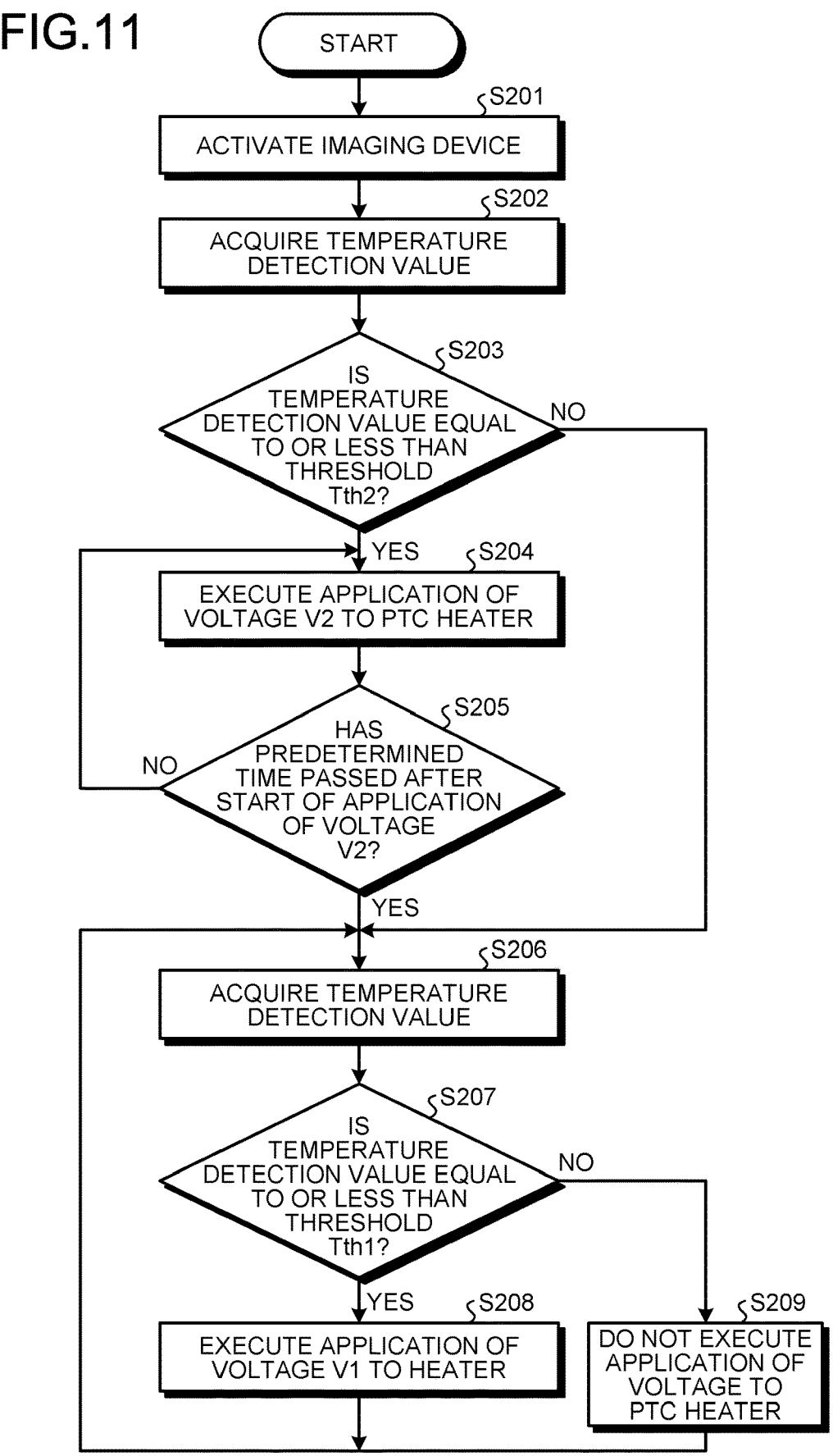
FIG. 11 is a flowchart illustrating an example of an operation of the imaging device according to the second embodiment.

FIG. 11 is a flowchart illustrating an example of the operation of the imaging device 1a according to the second embodiment.

When the imaging device 1a is activated (S201), the control circuit 42a acquires a temperature detection value from the temperature sensor 43 (S202). In S202, a detection value of the temperature inside the housing 10 at the time of activation is acquired. Then, the control circuit 42a determines whether or not the temperature detection value acquired in S202 is equal to or less than the threshold Tth2 (S203). In a case where it is determined that the temperature detection value is equal to or less than the threshold Tth2 (S203: Yes), the control circuit 42a controls the heater power supply unit 41 to execute application of the voltage V2 to the PTC heater 21 (S204). Note that the control circuit 42a starts the timer 44 at the start of the application of the voltage V2 to measure the elapsed time from the start of the application of the voltage V2.

Subsequently, the control circuit 42a determines whether or not a predetermined time has elapsed from the start of the application of the voltage V2 (S205). In a case where it is determined that the predetermined time has not elapsed (S205: No), the control proceeds to S204, and the application of the voltage V2 is continued.

In a case where it is determined in the determination processing of S203 that the temperature detection value exceeds the threshold Tth2 (S203: No), the processing of S204 and S205 is skipped.

In a case where it is determined that the predetermined time has elapsed (S205: Yes) or in a case where it is determined that the temperature detection value exceeds the threshold Tth2 (S203: No), the control circuit 42a acquires the temperature detection value from the temperature sensor 43 (S206). Then, the control circuit 42a determines whether or not the temperature detection value is equal to or less than the threshold Tth1 (S207). In a case where it is determined that the temperature detection value is equal to or less than the threshold Tth1 (S207: Yes), the control circuit 42a controls the heater power supply unit 41 to execute application of the voltage V1 to the PTC heater 21 (S208).

In a case where it is determined that the temperature detection value exceeds the threshold Tth1 (S207: No), the control circuit 42a controls the heater power supply unit 41 so as not to apply the voltage to the PTC heater 21 (S209). After S208 or S209, the control proceeds to S206.

Loop processing from S206 to S208 or S209 corresponds to the first control. Loop processing from S204 to S205 corresponds to a second control. The first control and the second control are executed at a predetermined control cycle. The processing from S202 to S209 ends when the operation of the imaging device 1a is stopped.

Note that, in the series of procedures illustrated in FIG. 11, in a case where the temperature detection value is equal to the threshold Tth2 in the determination processing of S203, the control proceeds to S204, and the application of the voltage V2 to the PTC heater 21 is executed. The processing in the case where the temperature detection value is equal to the threshold Tth2 is not limited thereto. In the case where the temperature detection value is equal to the threshold Tth2, the control may proceed to S206.

Further, in the case where the temperature detection value is equal to the threshold Tth1 in the determination processing of S207, the control proceeds to S208, and the voltage V1 is applied to the PTC heater 21. The processing in the case where the temperature detection value is equal to the threshold Tth1 is not limited thereto. In the case where the temperature detection value is equal to the threshold Tth1, the control proceeds to S209, and the application of the voltage to the PTC heater 21 may not be executed.

As described above, according to the second embodiment, in a case where the temperature detection value is lower than the threshold Tth2 at the time of activation, the heater control unit 40a executes the second control of supplying power of the voltage V2 larger than the voltage V1 to the PTC heater 21 for a predetermined time. When the second control ends, the heater control unit 40a executes the first control.

Thus, the freezing of the first lens 24 can be eliminated earlier as compared to a case where the voltage V1 is applied to the PTC heater 21. Further, it is possible to make it unnecessary to provide the vehicle with a function of performing control for quickly eliminating the freezing of the first lens 24.

In the second embodiment, the effect in the case of using another heater is larger than that in the case of using the PTC heater. In the PTC heater, application of the high voltage V2 just causes the temperature rise of the heater to be quick, but in other heaters, application of the high voltage V2 continuously for a long time causes heater deterioration, and thus the application is changed to the voltage V1 after a certain time using a timer.

Third Embodiment

According to a third embodiment, the imaging device is configured to be capable of turning on and off the execution of the control of the PTC heater according to the temperature detection value by the temperature sensor on the basis of a control signal from the outside.

Hereinafter, an imaging device 1b according to the third embodiment will be described. Note that, here, as an example, a case where the third embodiment is applied to the imaging device 1 according to the first embodiment will be described, but the third embodiment can also be used in combination with the second embodiment. Components similar to those of the imaging device 1 according to the first embodiment are denoted by the same names and reference numerals as those of the imaging device 1, and description thereof will be omitted or simplified.

Figure 12:
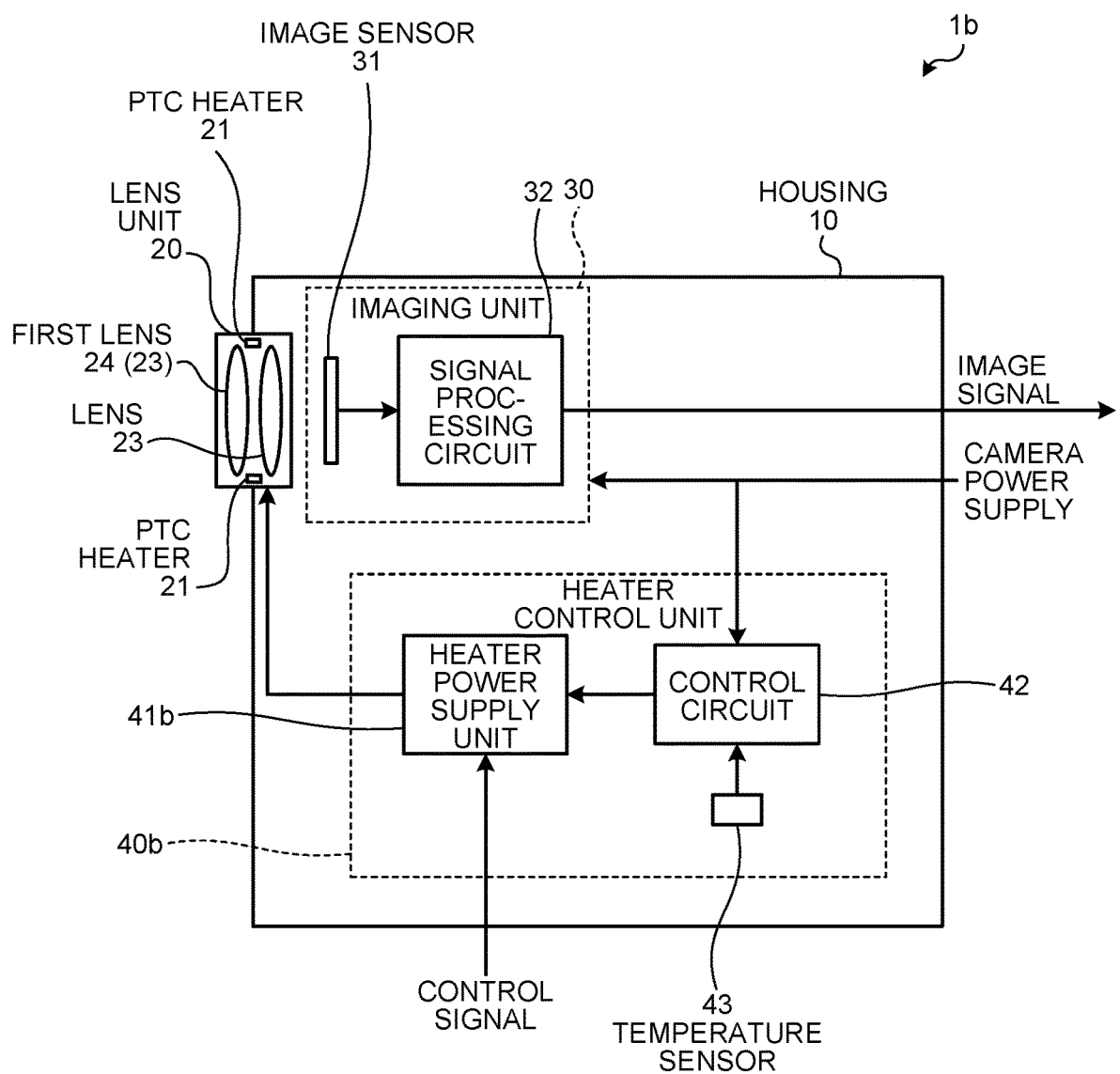
FIG. 12 is a schematic diagram illustrating an example of a configuration of an imaging device according to a third embodiment.

FIG. 12 is a schematic diagram illustrating an example of a configuration of the imaging device 1b according to the third embodiment. The imaging device 1b includes the housing 10, the lens unit 20, the imaging unit 30, and a heater control unit 40b. The imaging unit 30 includes the image sensor 31 and the signal processing circuit 32. The heater control unit 40b includes a heater power supply unit 41b, the control circuit 42, and the temperature sensor 43.

The heater power supply unit 41b can receive a control signal from the outside. The control signal is, for example, a binary signal that instructs on or off of the control of the PTC heater 21. In a case where the control signal indicating an on instruction is input, the heater power supply unit 41b can apply power to the PTC heater 21 under the control of the control circuit 42. In a case where the control signal indicating an off instruction is input, the heater power supply unit 41b cannot apply power to the PTC heater 21.

For example, the control signal is transmitted from a defroster switch provided in the vehicle interior of the vehicle. The defroster switch is a switch for turning on and off a defrost function for eliminating fogging of glass of the vehicle, and is operated by a driver, for example. That is, in conjunction with on/off of the defrost function, the function of eliminating dew condensation or freezing of the first lens 24 is turned on/off. Note that the transmission source of the control signal is not limited thereto. The control signal may be transmitted from the control device of the vehicle.

Figure 13:
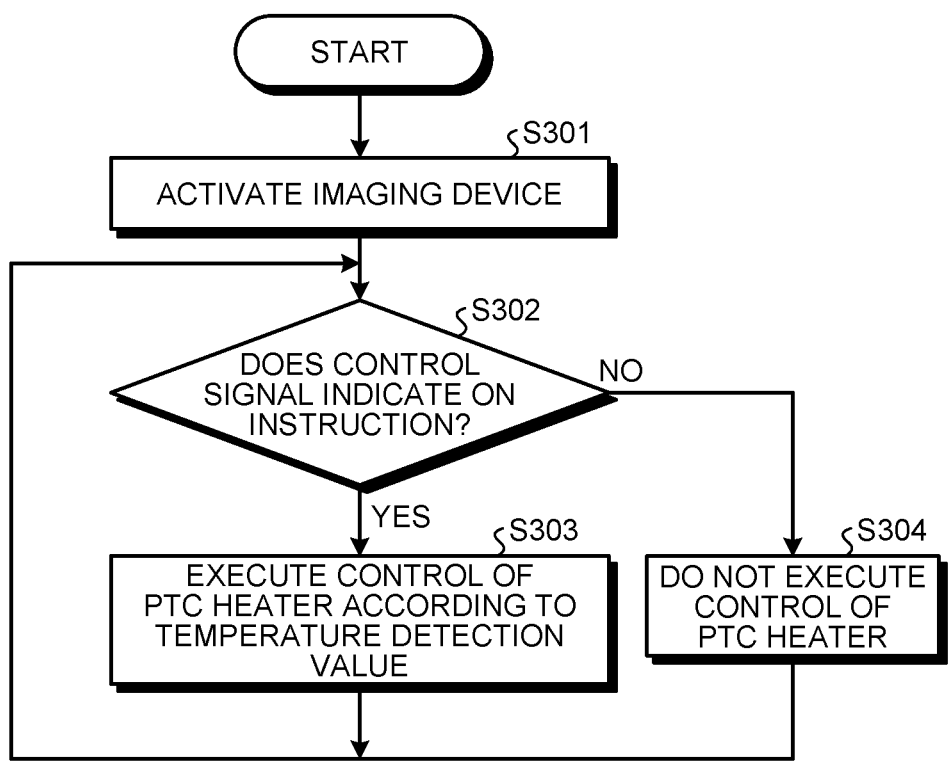
FIG. 13 is a flowchart illustrating an example of an operation of the imaging device according to the third embodiment.

FIG. 13 is a flowchart illustrating an example of the operation of the imaging device 1b according to the third embodiment.

When the imaging device 1b is activated (S301), the heater power supply unit 41b can receive a control signal. In a case where the control signal indicates the on instruction (S302), since the heater power supply unit 41b can apply a voltage to the PTC heater 21, the heater control unit 40b executes, by the control circuit 42, control of the PTC heater 21 according to the temperature detection value (S303). The control of the PTC heater 21 according to the temperature detection value is, for example, the first control, that is, loop processing from S102 to S104 or S105 illustrated in FIG. 7.

In a case where the control signal indicates the off instruction (S302: No), the heater power supply unit 41b cannot apply a voltage to the PTC heater 21, and thus the heater control unit 40b does not execute the control of the PTC heater 21 according to the temperature detection value (S304). After S303 or S304, the processing proceeds to S302.

Note that, in a case where the third embodiment is applied to the imaging device 1a according to the second embodiment, in S303, control from S203 to S208 or S209 illustrated in FIG. 11 can be executed.

Further, in the above description, the control signal is supplied to the heater power supply unit 41b. The supply destination of the control signal is not limited to the heater power supply unit 41b. The control signal is supplied to the control circuit 42, and the control circuit 42 may turn on/off the execution of the control of the PTC heater 21 according to the temperature detection value by the temperature sensor in accordance with the control signal.

As described above, according to the third embodiment, the heater control unit 40b can receive an input of a control signal indicating the on instruction or the off instruction. In a case where the control signal indicates the on instruction, the heater control unit 40b executes control of the PTC heater 21 according to the temperature detection value by the temperature sensor 43. In a case where the control signal indicates the off instruction, the heater control unit 40b does not supply power to the PTC heater 21.

Thus, it is possible to externally instruct whether or not to execute the control of the PTC heater 21.

Fourth Embodiment

A method of supplying power to the imaging device is not limited to a specific method. Hereinafter, an imaging device 1c according to a fourth embodiment will be described as an example of a method of supplying power to the imaging device. Note that a case where the fourth embodiment is applied to the imaging device 1 according to the first embodiment will be described, but the fourth embodiment can also be used in combination with the second or third embodiment. Components similar to those of the imaging device 1 according to the first embodiment are denoted by the same names and reference numerals as those of the imaging device 1, and description thereof will be omitted or simplified.

Figure 14:
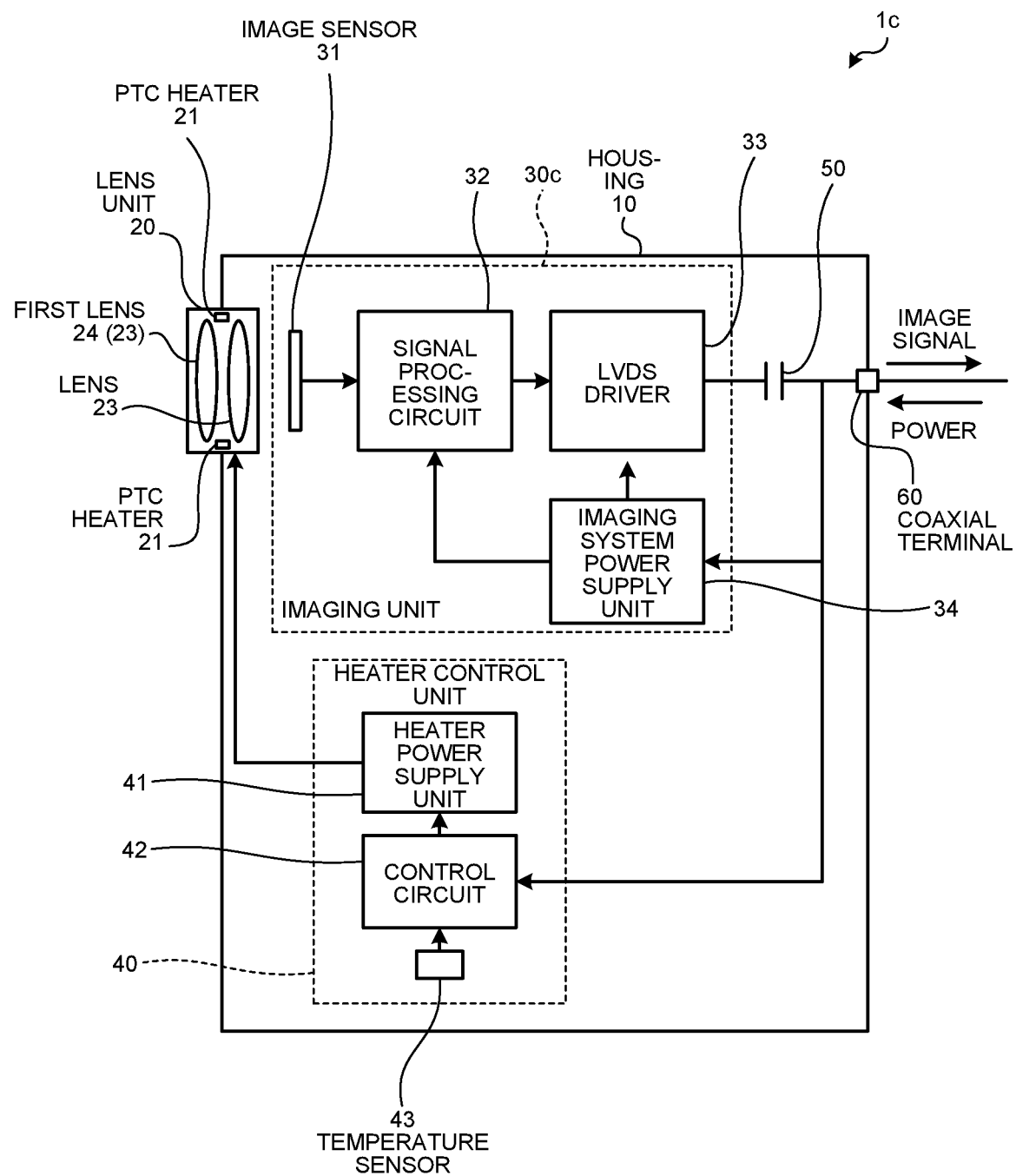
FIG. 14 is a schematic diagram illustrating an example of a configuration of an imaging device according to a fourth embodiment.

FIG. 14 is a schematic diagram illustrating an example of a configuration of the imaging device 1c according to the fourth embodiment. The imaging device 1c includes a housing 10, a lens unit 20, an imaging unit 30c, a heater control unit 40, and a capacitor 50. The housing 10 is provided with a coaxial terminal 60. The imaging unit 30c includes an image sensor 31, a signal processing circuit 32, a low voltage differential signaling (LVDS) driver 33, and an imaging system power supply unit 34. The heater control unit 40 includes a heater power supply unit 41, a control circuit 42, and the temperature sensor 43.

The coaxial terminal 60 is a connector of a coaxial cable. The coaxial terminal 60 can output an image signal and receive power supply from the outside.

The wirings from the coaxial terminal 60 are branched into three wirings inside the housing 10, and a first wiring among the three branched wirings is connected to the LVDS driver 33 via the capacitor 50. The LVDS driver 33 converts the image signal output from the signal processing circuit 32 into a low-voltage differential signal format and outputs the low-voltage differential signal. The image signal converted into the low-voltage differential signal is output to the outside via the capacitor 50 and the coaxial terminal 60.

The capacitor 50 can prevent power that is input from the outside from being input to the LVDS driver 33, and can transmit the low-voltage differential signal output from the LVDS driver 33.

A second wiring among the wirings from the three branched coaxial terminals 60 is connected to the imaging system power supply unit 34. The imaging system power supply unit 34 is a regulator circuit. The imaging system power supply unit 34 generates a voltage for driving the image sensor 31, the signal processing circuit 32, and the LVDS driver 33 on the basis of the power supplied via the second wiring. The imaging system power supply unit 34 supplies the generated voltage power to each of the image sensor 31, the signal processing circuit 32, and the LVDS driver 33.

A third wiring among the wirings from the three branched coaxial terminals 60 is connected to the control circuit 42. The control circuit 42 operates on the basis of the power supplied via the third wiring.

As described above, according to the fourth embodiment, the coaxial terminal 60 that outputs the image signal to the outside and receives power supply from the outside is provided in the housing 10. Then, the imaging device 1c distributes the power supplied from the coaxial terminal 60 to the imaging unit 30c and the heater control unit 40.

Thus, the PTC heater 21 can be operated without requiring a dedicated terminal for supplying power for causing the PTC heater 21 to generate heat.

Note that the above-described fourth embodiment is an example. The type of terminal that outputs the image signal to the outside or receives power supply from the outside is not limited to the coaxial terminal. Further, each of the imaging devices 1, 1a, and 1b according to the first to third embodiments may be provided with a terminal that outputs an image signal to the outside and a terminal that receives power supply from the outside.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A vehicular imaging device, comprising:
    a housing;
    a lens unit attached to the housing, the lens unit including at least one lens;
    a heater provided on the at least one lens inside the lens unit, the heater heating the at least one lens;
    an imaging unit that is housed in the housing and outputs, as an image signal, an optical image formed by a light flux passing through the lens unit;
    a temperature sensor housed in the housing and disposed outside the lens unit; and
    a heater control unit that is housed in the housing and controls the heater in accordance with a temperature value detected by the temperature sensor,
    wherein the heater control unit executes a first control to supply power of a first voltage of a first value to the heater at a time of activation of the imaging unit in a first case where the temperature value is equal to or less than a first threshold and higher than a second threshold,
    the heater control unit executes a second control not to supply power to the heater at the time of the activation of the imaging unit in a second case where the temperature value is higher than the first threshold,
    the heater control unit executes a third control to supply power of a second voltage of a second value larger than the first value to the heater for a predetermined time at the time of the activation of the imaging unit in a third case where the temperature value is equal to or less than the second threshold, and the heater control unit executes the first control or the second control when the third control ends, and
    the first threshold and the second threshold are less than an allowable upper limit temperature of the heater.

2. The vehicular imaging device according to claim 1, wherein
    the heater control unit is capable of receiving an input of a control signal indicating an on instruction or an off instruction, controls the heater in accordance with the temperature value in a fourth case where the control signal indicates the on instruction, and does not supply power to the heater in a fifth case where the control signal indicates the off instruction.

3. The vehicular imaging device according to claim 1, wherein
    the heater is provided at an outermost lens among the one or more lenses at least one lens.

4. The vehicular imaging device according to claim 3, wherein
    the heater is provided at an edge portion of the outermost lens.

5. The vehicular imaging device according to claim 1, further comprising:
    a coaxial terminal that outputs the image signal, receives a supply of power, and is provided in the housing,
    wherein the supply of power is distributed to the imaging unit and the heater control unit.

6. The vehicular imaging device according to claim 5, wherein the imaging unit comprises:
    an image sensor;
    a signal processing circuit;
    an imaging system power supply unit; and
    a low voltage differential signaling (LVDS) driver that converts the image signal, output from the signal processing circuit, into a low-voltage differential signal format and outputs the low-voltage differential signal,
    the imaging unit comprises a capacitor electrically connected to the coaxial terminal and the LVDS driver,
    wirings from the coaxial terminal are branched into a first wiring, a second wiring, and a third wiring inside the housing,
    the first wiring is electrically connected to the LVDS driver via the capacitor,
    the second wiring is electrically connected to the imaging system power supply unit, and
    the third wiring is electrically connected to the heater control unit.

7. The vehicular imaging device according to claim 1, wherein the heater control unit comprises:
    a control circuit;
    the temperature sensor; and
    a heater power supply unit that applies a voltage of a predetermined value to the heater.

8. The vehicular imaging device according to claim 1, wherein
the control signal is transmitted from a defroster switch for turning on and off a defrost function for eliminating fogging of glass of a vehicle, the defroster switch provided in an interior of the vehicle.

9. The vehicular imaging device according to claim 1, wherein the heater is a metal heater.

10. The vehicular imaging device according to claim 1, wherein the heater is a positive temperature coefficient (PTC) heater.

11. A vehicular imaging device, comprising:
a housing;
at least one lens supported by the housing;
a heater provided on the at least one lens, the heater heating the at least one lens;
an image sensor that is housed in the housing and outputs, as an image signal, an optical image formed by a light flux passing through the at least one lens;
a temperature sensor housed in the housing; and
a control circuit that is housed in the housing and controls the heater in accordance with a temperature value detected by the temperature sensor,
wherein the control circuit executes a first control to supply power of a first voltage of a first value to the heater at a time of activation of the vehicular imaging device in a first case where the temperature value is equal to or less than a first threshold and higher than a second threshold,
the control circuit executes a second control not to supply power to the heater at the time of the activation of the vehicular imaging device in a second case where the temperature value is higher than the first threshold,
the control circuit executes a third control to supply power of a second voltage of a second value larger than the first value to the heater for a predetermined time at the time of the activation of the vehicular imaging device in a third case where the temperature value is equal to or less than the second threshold, and the control circuit executes the first control or the second control when the third control ends, and
the first threshold and the second threshold are less than an allowable upper limit temperature of the heater.

* * * * *